(12) United States Patent
Wolf

(10) Patent No.: US 10,270,909 B2
(45) Date of Patent: Apr. 23, 2019

(54) SYSTEM AND METHOD FOR IMPROVING CALL CENTER COMMUNICATIONS

(71) Applicant: Metropolitan Life Insurance Co., New York, NY (US)

(72) Inventor: Tom Wolf, New York, NY (US)

(73) Assignee: METROPOLITAN LIFE INSURANCE CO., New York, NY (US)

(*) Notice: Subject to any disclaimer, the term of this patent is extended or adjusted under 35 U.S.C. 154(b) by 0 days.

(21) Appl. No.: 16/165,717

(22) Filed: Oct. 19, 2018

(65) Prior Publication Data

US 2019/0058792 A1 Feb. 21, 2019

Related U.S. Application Data

(63) Continuation of application No. 15/604,068, filed on May 24, 2017, now abandoned.

(60) Provisional application No. 62/340,841, filed on May 24, 2016.

(51) Int. Cl.

| H04M 3/00 | (2006.01) |
|---|---|
| H04M 3/51 | (2006.01) |
| G06F 17/30 | (2006.01) |
| H04M 3/523 | (2006.01) |
| H04L 29/08 | (2006.01) |
| H04M 7/00 | (2006.01) |

(52) U.S. Cl.
CPC .... H04M 3/5166 (2013.01); G06F 17/30654 (2013.01); H04L 67/146 (2013.01); H04M 3/5191 (2013.01); H04M 3/5238 (2013.01); H04M 7/0039 (2013.01); H04L 67/306 (2013.01); H04M 2203/6072 (2013.01)

(58) Field of Classification Search
CPC . H04M 3/5166; H04M 3/5191; H04M 7/0039
USPC ...... 379/265.01–265, 14, 266.01–266.1, 309
See application file for complete search history.

(56) References Cited

U.S. PATENT DOCUMENTS

| 6,064,730 | A  | * | 5/2000 | Ginsberg | H04M 3/5191 379/265.09 |
|---|---|---|---|---|---|
| 6,535,492 | B2 | * | 3/2003 | Shtivelman | G06F 17/30722 370/270 |
| 7,336,779 | B2 | * | 2/2008 | Boyer | H04M 3/51 379/265.02 |
| 7,415,417 | B2 | * | 8/2008 | Boyer | G06Q 30/016 705/346 |
| 9,537,924 | B2 | * | 1/2017 | Barnett | H04M 3/5232 |

(Continued)

*Primary Examiner* — William J Deane, Jr.
(74) *Attorney, Agent, or Firm* — Troutman Sanders LLP

(57) ABSTRACT

Methods and systems route requests for service in a call center. A non-transitory computer-readable medium stores data representative of a queue of customers waiting to be serviced. A processor queues a request for service initiated by a customer. Data output is sent to the customer to ascertain the customer's cause for the request via a data communication channel. Data input is received from the customer via the data communication channel. The data input indicates the customer's cause for the request. An agent is identified from a plurality of agents suitable to address the customer's cause for the request. The customer's position is adjusted in the queue based on the identified agent. A routing instruction is determined about routing the request to the identified agent.

15 Claims, 9 Drawing Sheets

(56) References Cited

U.S. PATENT DOCUMENTS

| | | | |
|---|---|---|---|
| 2003/0031309 A1* | 2/2003 | Rupe | H04M 3/523 |
| | | | 379/265.02 |
| 2003/0108186 A1* | 6/2003 | Brown | H04M 3/493 |
| | | | 379/266.01 |
| 2013/0263179 A1* | 10/2013 | Dow | H04N 21/458 |
| | | | 725/32 |
| 2015/0324772 A1* | 11/2015 | Sarris | G06Q 20/108 |
| | | | 705/42 |
| 2016/0212266 A1* | 7/2016 | Soundar | H04M 3/5235 |
| 2017/0221071 A1* | 8/2017 | York | G06Q 10/063112 |

\* cited by examiner

SYSTEM AND METHOD FOR IMPROVING CALL CENTER COMMUNICATIONS

CROSS-REFERENCE TO RELATED APPLICATIONS

This application is a continuation of U.S. patent application Ser. No. 15/604,068, filed May 24, 2017, which claims priority from U.S. Provisional Application No. 62/340,841 filed May 24, 2016, each of which is incorporated herein by reference in its entirety.

TECHNICAL FIELD DISCLOSED

The present invention relates to telecommunications, and in particular, to systems and processes for routing requests for service received via a voice or data communication channel based on information obtained via a voice or data communication channel.

BACKGROUND DISCLOSED

Many call centers use interactive voice response (IVR) systems to communicate with callers over the phone. An IVR system automates the calls, and can act in conjunction with or in place of live agents. Oftentimes, a caller is forced to navigate through tedious, annoying and difficult to understand voice menus that are prerecorded or computer-synthesized. IVR is sometimes criticized as being unhelpful and difficult to use due to poor design and lack of appreciation of the callers' needs. When the caller desires to speak to a live agent, the caller may nonetheless be forced to navigate through the voice menus or placed in a queue and experience a long wait time when no agent is immediately available. As a result, the caller oftentimes becomes frustrated and feels his or her right to speak to a live agent is being restricted. After all this, even if the live agent eventually becomes available, the caller may again experience frustration when the agent does not have adequate knowledge to address the caller's reason for the call.

It is desirable to have a system that improves its customers' experiences when contacting the call center, and at the same time reduces the operation cost of the call center. It is desirable to enable the customer to contact the call center or initiate a request for service by any method of communication, including, but not limited to, a call, a text message, a website or application, a voice interactive device or program such as Amazon Alexa, Google Home, and Siri, and a voice interactive program in an automobile such as OnStar, among many other possibilities. It is desirable to allow the customer to begin an interaction with a call center solution based on IVR by leveraging a technology. There is a need for a system that minimizes the caller's interaction with the IVR, and determines the caller's cause for request for service as quickly as possible so as to direct the caller to a suitable live agent with reduced wait time.

BRIEF SUMMARY

One aspect of the present technology relates to a system for routing a request for service in a call center. The system includes a non-transitory computer-readable medium storing data representative of a queue of customers waiting to be serviced. The system also includes a processor configured to queue the request for service initiated by a customer. The processor sends data output to the customer via a data communication channel to ascertain the customer's cause for the request. Data input is received from the customer via the data communication channel. The data input indicates the customer's cause for the request. A processor identifies one or more agents out of a plurality of agents that are suitable to address the customer's request for service. The customer's position in the queue is adjusted based on the identified agent and his or her current call queue. The processor determines a routing instruction about routing the request for service to the identified agent's queue.

Another aspect of the present technology relates to a method for routing a request for service in a call center. The method includes storing, by a non-transitory computer-readable medium, data representative of a queue of customers waiting to be serviced. One or more processors queue a request for service initiated by a customer. The processor sends data output to the customer via a data communication channel to ascertain the customer's cause for the request. The processor receives data input from the customer via the data communication channel. The data input indicates the customer's cause for the request. The processor identifies one or more agents from a plurality of agents suitable to address the customer's cause for the request. The processor adjusts the customer's position in the queue based on the identified agent. The processor determines a routing instruction about routing the customer's request to the identified agent's queue.

A further aspect of the present technology relates to a non-transitory computer-readable medium with computer-executable instructions for causing one or more processors to execute the computer-executable instructions as follows. The one or more processors queue a request for service initiated by a customer. Data output is sent to the customer via a data communication channel to ascertain the customer's cause for the request. Data input is received from the customer via the data communication channel. The data input indicates the customer's cause for the request. One or more agents are identified from a plurality of agents suitable to address the customer's cause for the request. The customer's position in the queue is adjusted based on the identified agent. A routing instruction about routing the customer's request to the identified agent's queue is then determined.

A further aspect of the present technology relates to the system leveraging machine learning based on the customer action to accurately predict a series of answers and solutions helping the customer to receive a solution as they wait for connection to a customer service agent. As the customer continues working through their problem leveraging the artificial intelligence suggestions, the customer either moves higher in the queue or completes their query and exits As customers effectively researches solutions to their specific question, performing actions to move up the queue, this reduces their time in the queue by moving them up in priority. In addition, rewards can be offered to customers who can move through the queue as quickly as possible in the form of a monetary or other prize for eliminating the need to speak with a customer agent.

Authentication of the customer occurs via one or more forms of communication, including but not limited to, phone, app, mobile, and web, among many other possibilities. A customer who needs support may initiate a request for service by initiating a session. The customer may be placed in an IVR queue after the customer is authenticated through his or her initial mode of connection.

Various aspects of the described example embodiments may be combined with aspects of certain other example embodiments to realize yet further embodiments. It is to be understood that one or more features of any one example may be combined with one or more features of the other example. In addition, any single feature or combination of features in any example or examples may constitute patentable subject matter. Other features of the technology will be apparent from consideration of the information contained in the following detailed description.

BRIEF DESCRIPTION OF THE DRAWINGS

The following Detailed Description is better understood when read in conjunction with the appended drawings. For the purposes of illustration, there is shown in the drawings exemplary embodiments, but the subject matter is not limited to the specific elements and instrumentalities disclosed.

DETAILED DESCRIPTION

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

1. System Overview

Figure 1:
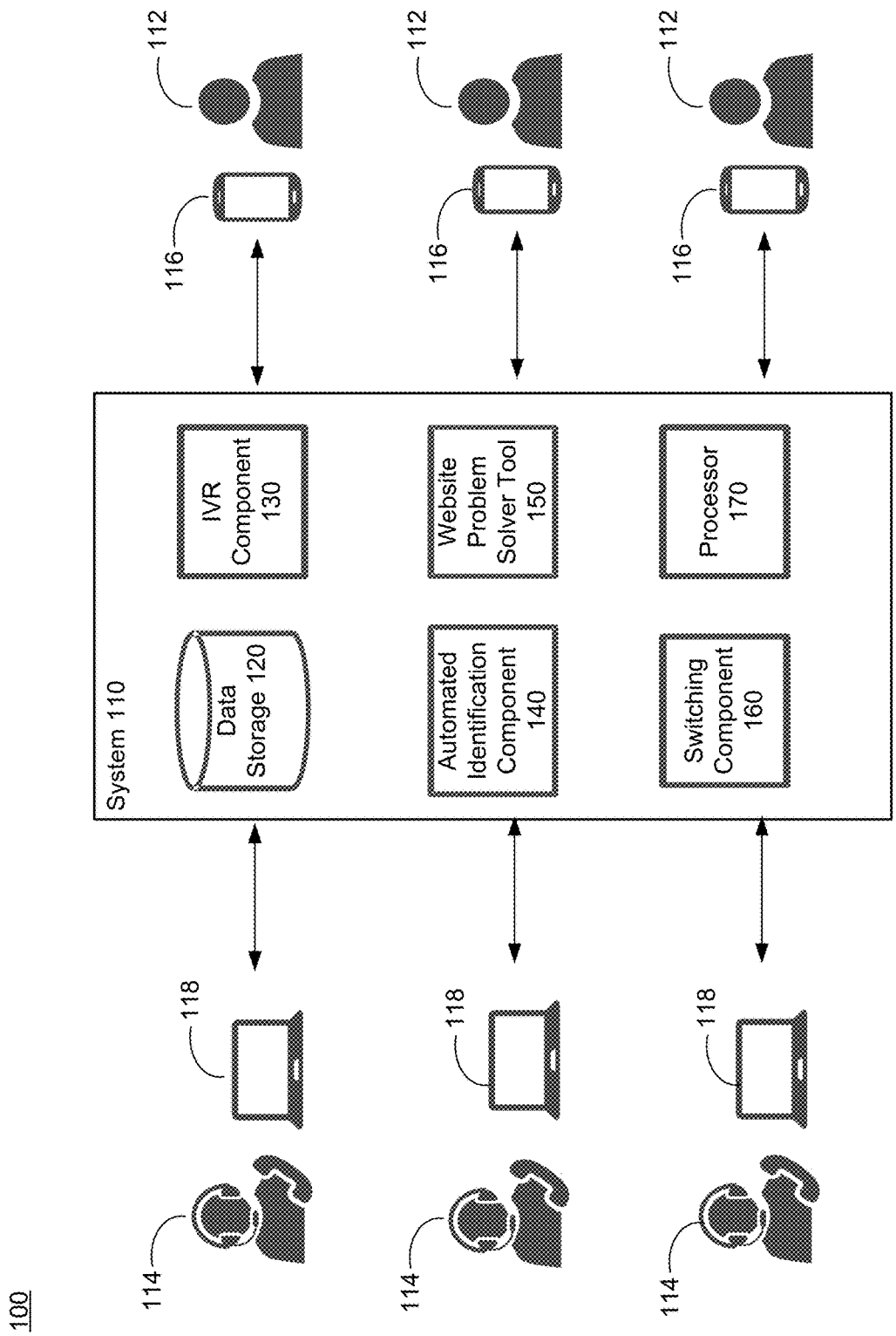
FIG. 1 illustrates an example block diagram of a call center system according to one aspect of the disclosed technology.

FIG. 1 illustrates an architectural overview of a call center 100. The call center 100 may implement a system 110 sized to handle large requests for service between customers 112 and agents 114. In a typical call center scenario, a customer 112 may initiate a request for service by dialing a phone number of the call center 100 using his/her mobile device 116. Further, instead of dialing the phone number of the call center 100, the customer 112 may initiate the request for service by texting the call center 100 via the mobile device 116. Alternatively, the customer 112 may initiate the request for service from any one of the following: a website or application, a voice interactive device or program such as Amazon Alexa, Google Home, and Siri, and a voice interactive program in an automobile such as OnStar, among many other possibilities. The system 110 may route the requests for service to agent terminals 118 to be answered by the agents 114.

The system 110 may communicate with the mobile devices 116 via voice and data communication channels. Communications may be achieved via one or more of the following networks: a public-switched telephone network ("PSTN"), a cellular network such as a Global System for Mobile Communications network ("GSM"), a Code Division Multiple Access ("CDMA") network, 3G/4G network, a satellite communication network, a local area network ("LAN"), such as an Ethernet network, a wide-area network, a virtual network, including without limitation a virtual private network ("VPN"), the Internet, an intranet, an extranet, and a wireless network (e.g., a network operating under any of the IEEE 802.11 suite of protocols, the Bluetooth® protocol known in the art, and/or any other wireless protocol), among other possibilities.

In one example, the voice communication channel may transmit voice over the PSTN. For example, the mobile device 116 may initiate voice communication with the system 110 via the PSTN.

The data communication channel may support wireless data transmission. In one example, the data communication channel may transmit data over the packet switched network, such as the Internet. The data communication channel may use standard Internet protocols. As a result, the system 110 may initiate data communication with the mobile device 116 via the Internet.

The system 110 may be implemented based on interactive voice response (IVR) technology or other customer service system platforms. In one embodiment, the system 110 may include data storage 120, an IVR component 130, an automated identification component 140, a website problem solver tool 150, a switching component 160 and a processor 170, among other possibilities. Discussions with respect to each of them are provided below.

1.1 Data Storage

The data storage 120 may be any one or a combination of a hard drive, random access memory, flash memory, read-only memory and a memory cache, among other possibilities. The data storage 120 may include a non-transitory computer-readable medium. The data storage 120 may include a database implemented as relational database tables or structured XML documents.

In one example, the database may be a customer database, including a plurality of customer profiles, where each profile may be identified by a unique customer identifier. In one example, the customer identifier may be a phone number associated with the customer. The customer profile may include authentication information to verify identity of the customer, including, but not limited to, phone number, address, mother's maiden name, favorite place, social security number, account number, password, passcode, PIN number, and biometrics such as voice print, among other possibilities. In some cases, each customer profile may track the history of interactions that the system 110 had with the customer, for example, the customer's previous requests for service and agents whom the customer previously spoke to. The call center may be operated by a telephone banking service provider, a credit card service provider, an insurance service provider or a travel-related service provider, among others. Each customer may be considered as a customer to the service provider, and each customer profile may be considered as a customer profile maintained by the service provider. To that end, each customer profile may include transaction history, invoices, credits, rewards and payment information, among other information associated with the customer.

In one example, the data storage 120 may store one or more call queues representative of customers on hold waiting to speak to agents. The queue may be a priority queue, a first-in-first-out data structure, or any other queuing data structures known to those skilled in the art.

In one example, the data storage 120 may store greetings or announcements in audio or other formats to be played to the customers.

1.2 Interactive Voice Response Component

The IVR component 130 may accept incoming requests for service from the customers 112, and provide automated, voice-based services to the customers 112. As discussed earlier, the request for service may be initiated by the customer in any form, including but not limited to, voice call, text, a request generated from a website, a voice interactive device or program, among many other possibilities.

The IVR component 130 may present stored greetings and audio prompts to the customers. The IVR component 130 may receive inputs from the customers via dual tone multi-frequency (DTMF) tones. For example, when a customer 112 calls the call center 100, the customer 112 may use DTMF tones to perform various functions, such as navigating through a voice menu of questions.

The IVR component 130 may also rely on speech recognition to recognize speech inputs from the customers. For instance, the IVR component 130 may include a real-time speech recognition module to recognize a customer's speech in real time.

1.3 Automated Identification Component

The system 110 may for security purposes authenticate the customers before providing any substantive services to each customer.

For example, the automated identification system 140 may authenticate a customer before adding the customer to a call queue. In one embodiment, the automated identification component 140 may service authentication inquiries by providing a verbal dialogue to the customer 112. The verbal dialogue may include prerecorded or dynamically generated audio instructions to the customer 112. The automated identification component 140 may request authentication information from the customer 112 to prove his or her identity by providing authentication information. The authentication information may include information that may identify the customer, including but not limited to, address, mother's maiden name, favorite place, social security number, account number, password, passcode, PIN number, and biometrics such as voice print, among other possibilities. In the other embodiments, the authentication identification component 140 may request the authentication information from the customer using the same communication mechanism as the customer 112 uses to initiate the request for service, e.g., by using texting, website, voice interactive device or program, among other possibilities. The customer 112 may respond to the authentication identification component 140 via telephone keypad input or speech input by mobile device 116, website, or a voice interactive device or program.

The authentication identification component 140 may compare the customer's input to pre-stored authentication information. If the customer's input fails to match the pre-stored authentication information, the customer may be required to retry and/or provide additional responses. In the alternative or after a predetermined number of failed attempts, the customer may be denied substantive services by the call center 100, or placed in a queue to speak to a live agent for general inquiries.

In one example, the automated identification component 140 may authenticate the customer without prompting for any input. The automated identification component 140 may authenticate the customer based on calling line identification, calling number delivery, calling number identification and calling line identification presentation, among other possibilities. For instance, the automated identification component 140 may authenticate the customer based on the phone number that the customer is calling from.

1.4 Website Problem Solver Tool

The website problem solver tool 150 may identify each customer's cause for the request for service via a data communication channel by presenting to the customer one or more questions. The customer's cause for the request for service may include, but not limited to, context of the request and nature of the customer's needs, among other possibilities. The tool 150 may present the one or more questions to the customer's mobile device 116, or any other device accessible to the customer with capabilities to provide the questions to the customer.

In one example, the tool 150 may transmit an instruction to the mobile device 116 to launch a mobile browser on the customer's mobile device 116. The tool 150 may instruct the mobile device 116 to open one or more web pages, web applications, or web sites on the customer's mobile device 116. For example, the tool 150 may send to the mobile device 116 a uniform resource locator (URL) that identifies the web page to be opened in the mobile browser. The web page may be implemented by any programming or scripting language, including but not limited to, Java™, C, C# or C++, Perl, Python, and TCL, among other possibilities. The web page may belong to the call center and provide one or more questions to ascertain the customer's cause for the request. The questions may be crafted and arranged in a manner that gradually reduces the customer's scope of inquiry. FIGS. 6-11 provide exemplary questions that may be presented to the customer. The customer may respond to each question by providing an input to the web page using the customer's mobile device 116.

The tool 150 may include a web server that receives the customer's input to the web page. The web server may run one or more server applications, including, but not limited to, an HTTP server, an FTP server, a CGI server, a database server, a Java sever, and the like. The web server may be one or more general purpose computers capable of executing web applications, programs or scripts.

In one example, once the customer is placed in a call queue, the tool 150 may send an instruction to the mobile device 116 to open a web page in the browser. The customer may respond to questions on the web page while waiting in the call queue.

As the customer responds to the questions, the customer's cause for the request becomes refined or specific. Once the customer's cause for the request is ascertained, the tool 150 may present solutions via one or more web pages to address the customer's cause for the request. In one embodiment, the solutions are predefined responses. If the presented solution addresses all the information sought by the customer for purposes of placing the request for service, the customer may terminate the request. If the customer does not find the information he or she needs on the web page, the customer may continue staying on the line to wait for his/her service.

In one example, the tool 150 may relay each input provided by the customer to the processor 170 which may determine the customer's cause for the request. The processor 170 may identify an agent with a skill set suitable to address the customer's cause for the request. The processor 170 may route the customer's request to the identified agent. If the identified agent is busy, the processor 170 may remove the customer from the original queue, and add the customer to a queue specifically associated with the identified agent.

Sometimes, instead of identifying a single suitable agent to answer the customer, the processor 170 may identify a group of agents suitable to answer the customer, and add the customer to a queue associated with the group. A group may contain subgroups with more refined and specific skill sets, and each subgroup may have its own queue. As the customer's cause for the request becomes more refined and specific, the processor 170 may pinpoint the group or subgroup in the best position to answer the customer's request, and move the customer to the relevant queue.

In another example, instead of removing the customer from the original queue, the processor 170 may escalate the customer's position in the original queue and direct the customer to the identified agent as soon as that agent becomes available.

In some embodiments, the tool 150 may present to the customer status information about the customer's waiting status in the call queue. The tool 160 may receive the customer's position in the queue from the processor 170, and display the customer's position in the queue in the web page. As the customer responds to more and more questions, the processor 170 may gradually escalate the customer's position in the queue. In one example, the processor 170 may escalate the customer's position in the queue after the customer's each input.

The processor 170 may provide the customer's escalated position to the tool 150. The tool 160 may in turn display the customer's escalated position in the web page. The tool 150 may receive an estimate of the customer's wait time from the processor 170. For example, as the customer becomes escalated in the queue, the customer's estimated wait time becomes reduced.

The tool 150 may display in the web page any update of the customer's position in the queue or any update of the customer's estimated wait time. Such display may encourage the customer to respond to as many questions as possible. FIGS. 6-11 provide exemplary web pages which display the customer's escalated position in the queue and reduced wait period as the customer answers each question.

As a result, the tool 150 may tend to the customer's needs, and help the customer to avoid extensive wait time in the queue. As a result, the agents may have more time to deal with complex interactions. Thus, the tool 150 may increase an overall efficiency of the system 110.

1.5 Switching Component

The switching component 160 may intercept incoming requests for service to the call center 100 for destination routing. The switching component 160 may refer to one or more switches, including a plurality of local switches and a central switch. The switching component 160 may include a telephone exchange or telephone switch, such as an automated call distributor (ACD) type switch, a private branch exchange ("PBX"), or a session initiation protocol ("SIP") switch, or some other suitable switches capable of processing requests for service. In one example, the switching component 160 may be connected to the PSTN via a plurality of trunks or links.

In one example, when the switching component 160 receives a request for service, the switching component 160 may alert the processor 170 about the request. The processor 170 may determine how to route the request. For instance, the processor 170 may first instruct the switching component 160 to route the request to a voice menu implemented by the automated identification component 140 or the IVR component 130. Once the processor 170 determines a suitable agent to answer the request, the processor 107 may send a routing instruction to the switching component 160, which in turn may route the request to the agent. When the agent is not yet available, the switching component 160 may temporarily place the customer on hold in the queue.

1.6 Processor

The processor 170 may refer to a single data processor on a single computing device or a collection of data processors. The collection of data processors may reside on a single computing device or spread across multiple computing devices.

The processor 170 may execute computer program code stored in the data storage 120 or a memory. In one example, the processor 170 may execute computer program code representative of functionalities of various components of the system 110, including for example the IVR component 130, the automated identification component 140 and the website problem solver tool 150, among other possibilities.

In one example, when a customer 112 places a request for service with the call center 100, the processor 170 may instruct the automated identification component 140 to present one or more authentication questions to the customer 112, and retrieve a customer profile from the data storage 120 to verify the customer's response to the authentication questions. If there is no existing customer profile associated with the customer, the processor 170 may create a profile for the customer and store it in the data storage 120.

Once the customer passes authentication, the processor 170 may add the customer to a queue of waiting customers, and calculate an estimated wait time before the customer can speak to an agent.

The processor 170 may instruct the web site problem solver tool 150 to open a web page to the customer. In one embodiment, the web page may be opened on the customer's mobile device 116. The web page may present one or more questions requiring the customer's input to ascertain the customer's cause for the request. The processor 170 may ascertain the customer's cause for the request based on the customer's input on the web page. The processor 110 may determine an agent suitable to address the customer's request by taking into consideration of the customer profile, the customer's cause for the request, the skill set and experience level of the agents, and availability of the agents. The processor 170 may reward customers who respond to the questions by providing monetary or other prizes to the customers, as these customers may eliminate or reduce agent's response time. The processor may remove the customer from the queue where the customer is originally placed. The processor may provide a routing instruction to the switching component 160 to route the customer's request to the determined agent. If the agent is not immediately available, the processor may add the customer to a queue specifically associated with the agent. Sometimes, the processor 170 may determine a group of agents suitable to address the call. The processor may provide a routing instruction to the switching component 160 to route the customer's request to the next available agent in that group. If none of the agents in that group are immediately available, the processor 170 may add the customer to a queue specifically associated with that group.

The processor 170 may update the customer's profile to include one or more of the following: the customer's cause for the request, the customer's input on the web page, and the agent whom the customer speaks to, among other possibilities.

Figure 2:
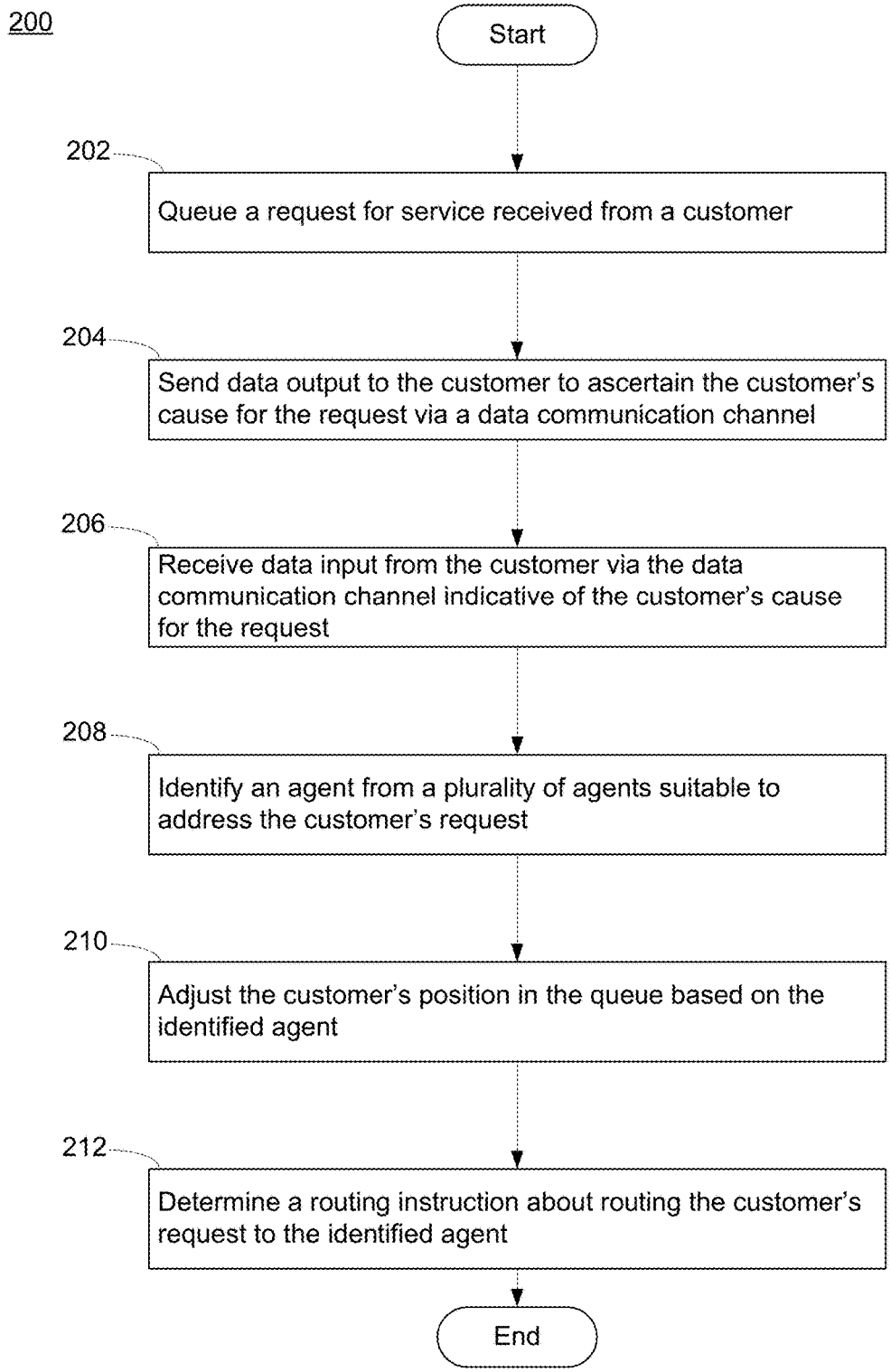
FIG. 2 is a flow chart illustrating example steps executable by a processor to route a request for service in the call center system according to one aspect of the present technology.

FIG. 2 is a flow chart 200 illustrating example steps that may be executed by the processor 170 according to one aspect of the present technology. At 202, the processor 170 may queue a request for service received from the customer. For instance, the processor 170 may queue a customer's call received via a voice communication channel generated from the customer's mobile device 116. At 204, the processor may send data output to the customer to ascertain the customer's cause for the request via a data communication channel. At 206, the processor may receive data input from the customer via the data communication channel indicative of the customer's cause for the request. For instance, the processor may receive data input from the customer's mobile device 116. At 208, the processor may identify an agent from a plurality of agents suitable to address the customer's cause for the request. At 210, the processor may adjust the customer's position in the queue based on the identified agent. A 212, the processor may determine a routing instruction about routing the customer's request to the identified agent.

Figure 3:
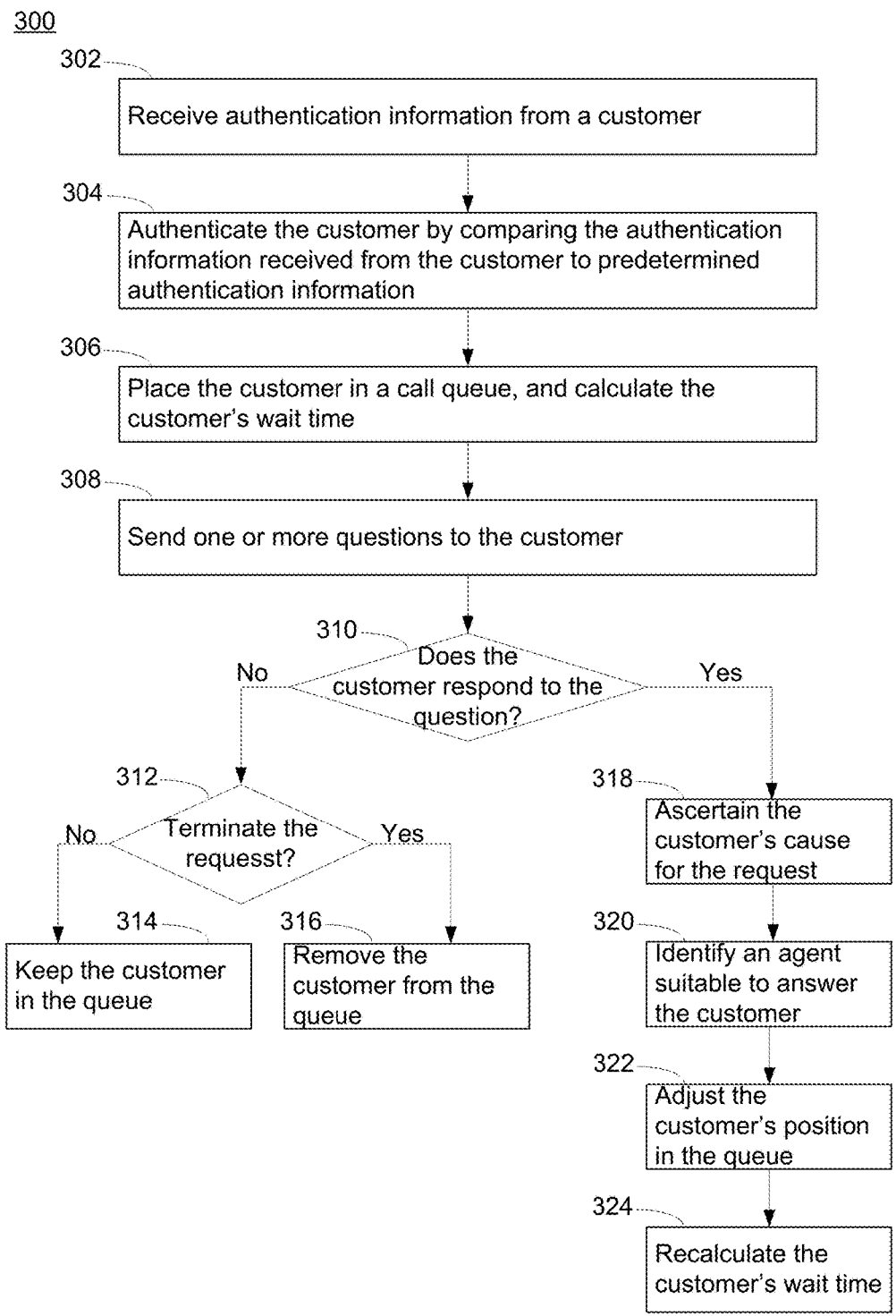
FIG. 3 is a flow chart illustrating example steps executable by a processor to route a request for service according to another aspect of the present technology.

FIG. 3 is a flow chart 300 illustrating example steps that may be executed by the processor 170 according to another aspect of the present technology. At 302, the processor 170 may receive authentication information from a customer. The authentication information may be received over a voice communication channel or other communication mechanisms. At 304, the processor may authenticate the customer by comparing the authentication information received from the customer to predetermined authentication information. The predetermined authentication information may be retrieved from the data storage 120. At 306, the processor may place the customer in a call queue. The processor may calculate the customer's wait time. At 308, the processor may send one or more questions to the customer. For example, the process may open a web page on the customer's mobile device. The web page may display one or more questions requiring the customer's input. At 310, the processor may determine if the customer responds to any question. If the customer does not respond to the question, at 312, the processor may determine if the customer terminates the call. If the customer does not terminate the call, at 314, the system may keep the customer in the queue until an agent becomes available. If the customer terminates the call, at 316, the processor may remove the customer from the queue. However, if the customer responds to the question, at 318, the processor may ascertain the customer's cause for the request. At 320, the processor may identify an agent suitable to answer the customer. At 322, the processor may adjust the customer's position in the queue. At 324, the processor may recalculate the customer's wait time. Once the processor ascertains the customer's cause for the request, the processor may identify a suitable solution to address the customer's cause for the request and display the solution on the web page.

2. Agents and Agent Terminals

The agent terminal 118 may include one or more of the following: a phone, a headset, a handset, a software-based phone a computer, a camera, a microphone, a speaker, or any type of devices suitable for handling requests for service from customers. The agent terminal 118 may be connected with the switching component 160 via, for example, internal telephone wiring. The agent terminal 118 may include software or hardware for performing packet-based data transmission to transmit data such as voice, video, or text. For instance, the agent terminal 118 may accept email requests, and may also engage each customer through a chat interface or an instant message interface.

The agent 114 may access each customer's profile via the agent terminal 118. The agent may have a preview of the queue of customers. Before the agent is connected to any customer, the agent may view the customer's profile at the agent terminal 118 so as to be able to readily assist the customer once connected. While viewing the customer's profile, the agent may view the customer's cause for the request as indicated in the customer's profile, the customer's response to any of the web page questions, and any prior interaction such as exchanges that the customer had with the call center 100. With that information, the agent may not need to repeat questions that were previously presented to the customer, thereby saving time of the agent and the customer.

The agents 114 working at the call center 100 may be divided by, or assigned to, groups designated for handling specific tasks or specific customers. The groups may have distinct skill sets. One group of general agents may be trained to answer general questions to identify the customer's cause for the request, and direct the customers to specialized agents who are able to address the customer's specific needs. Each group of specialized agent may have subgroups with more specific, distinct skill sets.

By way of example, a call center of a commercial website offering travel-related services may include a group of general agents to identify the customer's cause for the request. The call center may also include groups of specialized agents who are familiar with making a new reservation, changing an existing reservation and promotion deals, respectively. The group of agents who are familiar with making a new reservation may include subgroups each specialized in reserving flight, cruise, hotel, and car rental. The subgroup of agents specialized in making cruise reservation may include more distinct subgroups of agents divided based on travel destinations, including Europe, Asia, North America, South America, Australia and Africa.

Each group or subgroup may have its associated queue of waiting customers. The length of each queue may vary depending on the customer demands. For instance, the queue associated with the group of general agents responsible for general questions may generally be longer than queues associated with groups of specialized agents.

In one embodiment, when the customer passes authentication, the customer may be first placed in a queue associated with the group of agents trained to answer general questions. Once the processor 170 starts to ascertain the customer's cause for the request, the processor 170 may move the customer to a queue associated with a group of specialized agents trained to address the customer's specific needs. As the customer's cause for the request becomes more refined and specific, or as the customer's needs become particularized, the processor may move the customer to the queue of a subgroup of agents more qualified to answer the customer.

3. Customer's Mobile Device

The customer's mobile device 116 may be a mobile telecommunication device, including but not limited to, a smart phone, a cell phone, a wired or cordless phone, a radiotelephone, a tablet computer, a personal digital assistant (PDA), a laptop and a personal communications system (PCS) terminal, among other possibilities. The mobile device 118 may communicate with other devices via one or more communication towers using a wireless communication protocol, e.g., Global System for mobile communications (GSM), Code division multiple access (DMA), wideband CDMA (WCDMA) and 802.11x, among other possibilities. The mobile device 116 may be associated with a phone number. The mobile device 116 may access the Internet. The mobile device 116 may run third-party applications.

The mobile device 116 may have a graphical user interface, such as, but not limited to, a capacitive touch screen panel or a liquid crystal display (LCD). As shown in FIGS. 6-11, the mobile device 116 may display web content associated with a URL.

In one embodiment, when the customer 112 places a request for service with the call center 100, the mobile device 116 may receive an instruction from the website problem solver tool 150 to launch a mobile browser on the mobile device 116 and open a web page designated by the tool 150 in the mobile browser.

4. Exemplary Operations

Figure 4:
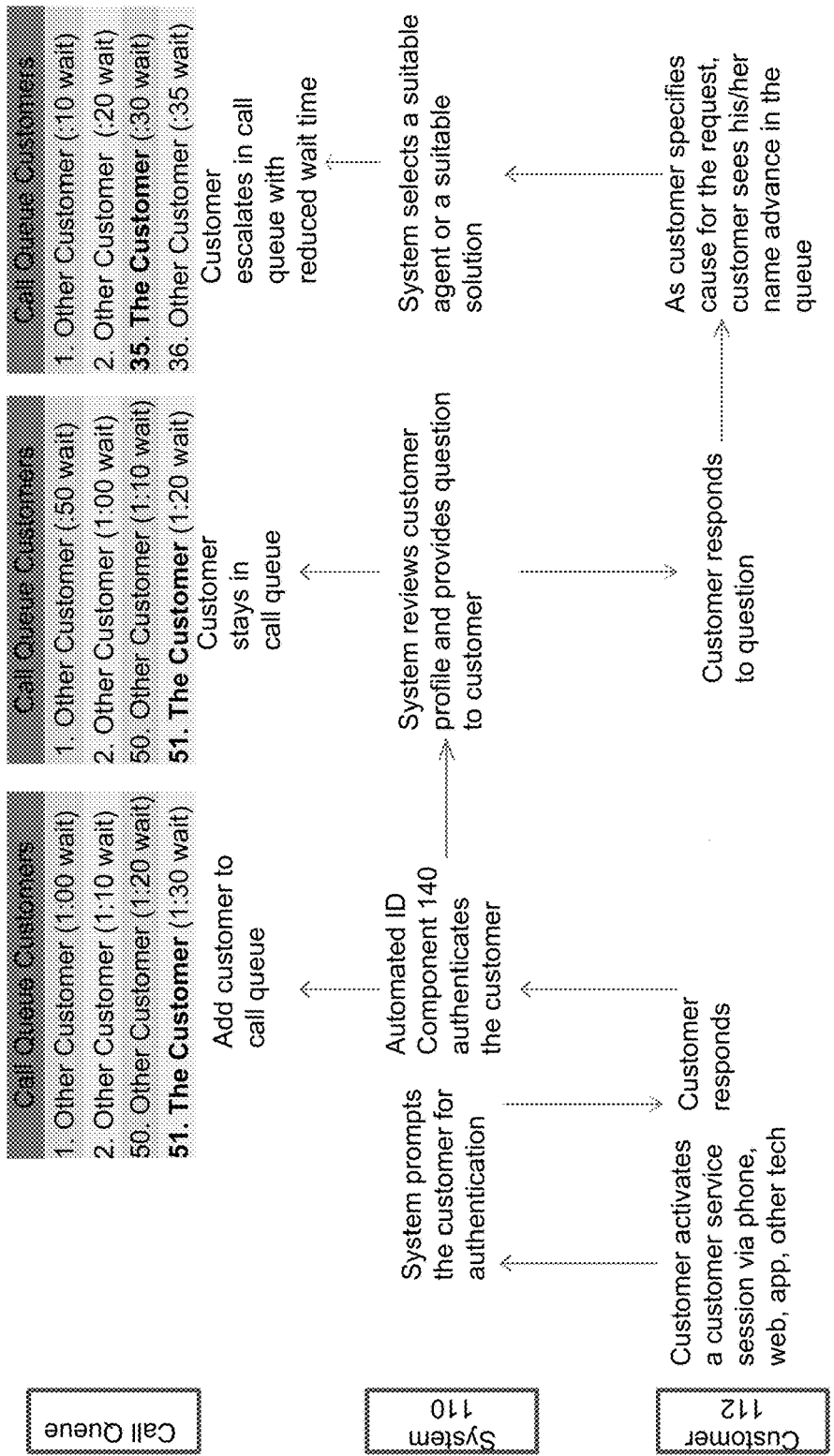
FIG. 4 illustrates a high-level process flow of the call center system according to one aspect of the disclosed technology.

FIG. 4 illustrates a high-level process flow of the call center system 110 according to one aspect of the disclosed technology. First, a customer 112 places a request for service to activate a customer service session. The customer places the request via a mobile device 116, such as a smart phone, a web site or an application, among other possibilities. The system 110 at the call center 100 prompts the customer 112 for authentication information. The system 110 authenticates the customer via the automated identification component 140. Once the customer is authenticated, the system 110 places the customer in a call queue. The system 110 reviews the customer profile and provides one or more questions to the customer. For example, the system 110 may open a web page on the customer's mobile device via the website problem solver tool 150, where the web page contains one or more questions. The customer responds to questions while continuously staying in the queue. Each time the customer responds to a question, the system escalates the customer's position in the queue and reduces the customer's wait time. Each question may be crafted to solicit the customer's cause for the request. For example, each question may reduce the scope of customer's inquiry. As the customer specifies his or her cause for the request, the customer sees on the web page that his or her name advances in the queue.

The system identifies a suitable solution to address the customer's inquiry. The system may provide the solution through the web page. If the solution meets the customer's needs, the customer can terminate the request for service and be removed from the call queue. However, if the customer is not satisfied with the solution, or the system is unable to identify a suitable solution to be presented to the customer, the system identifies a suitable agent to answer the customer's request for service and moves up the customer in the queue.

In one embodiment, the customer may opt out of web page participation. The customer may stay in the queue until an agent becomes available to answer the customer's request. Based on the customer's cause for the request, the system may indicate how much time the customer could have saved by answering questions provided on the web page.

Figure 5:
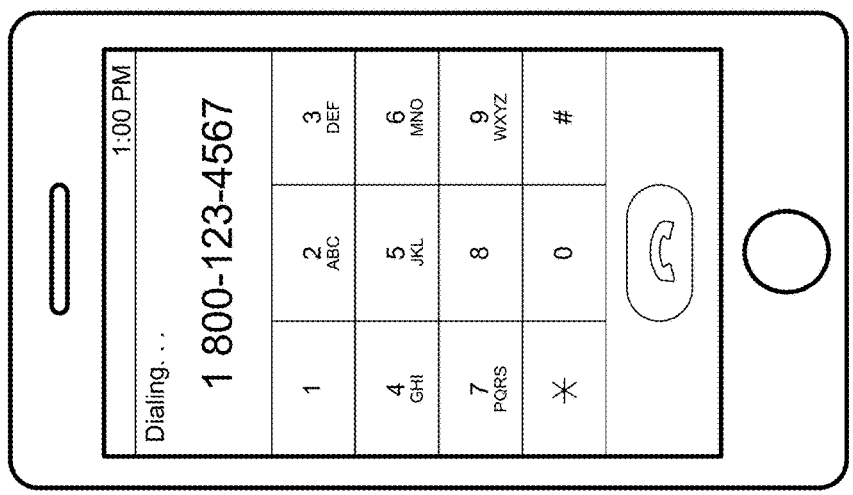
FIGS. 5-12 illustrate an exemplary user interface of a customer's mobile device when the customer contacts the call center system according to one aspect of the present technology.
Figure 7:
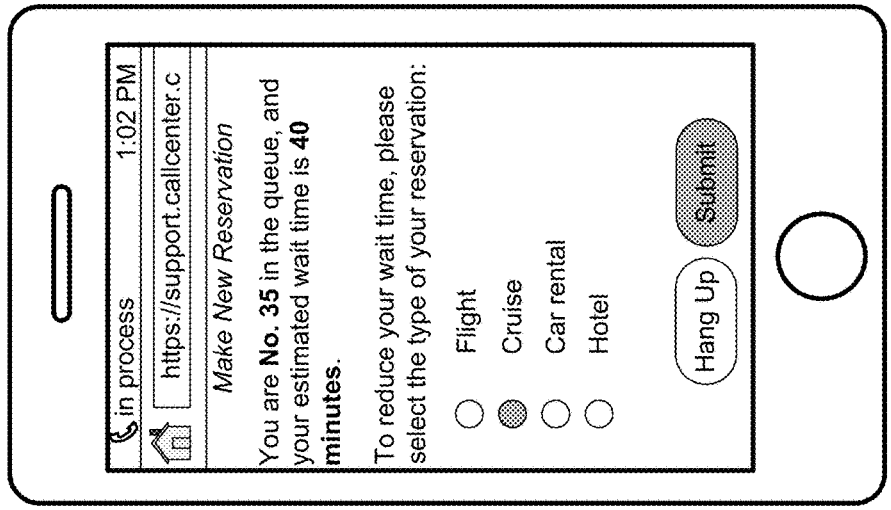
Figure 6:
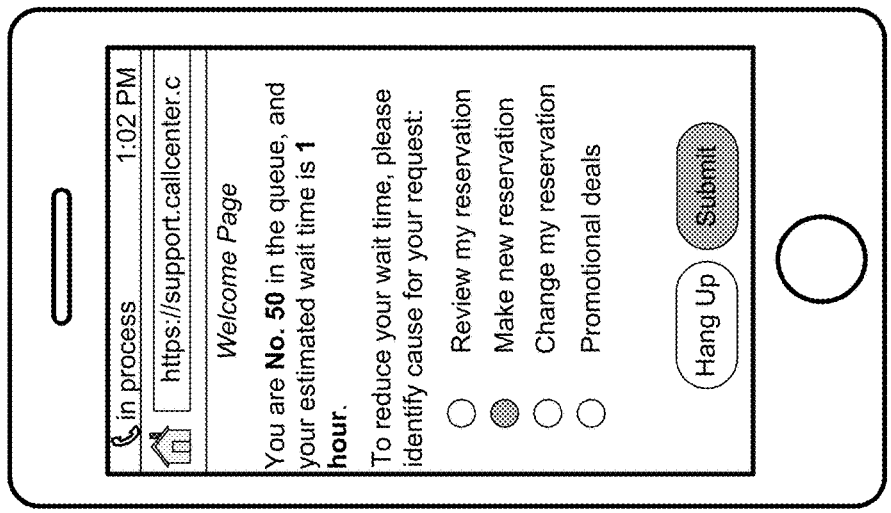
Figure 9:
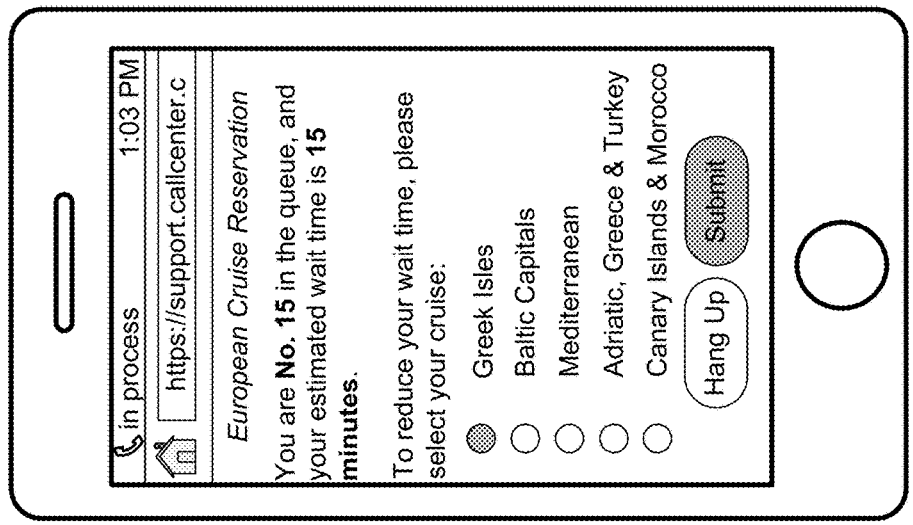
Figure 8:
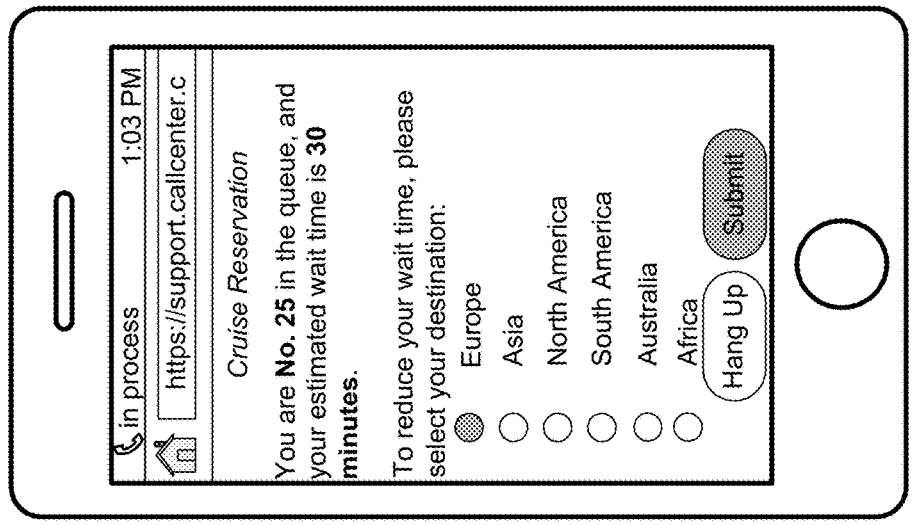
Figure 11:
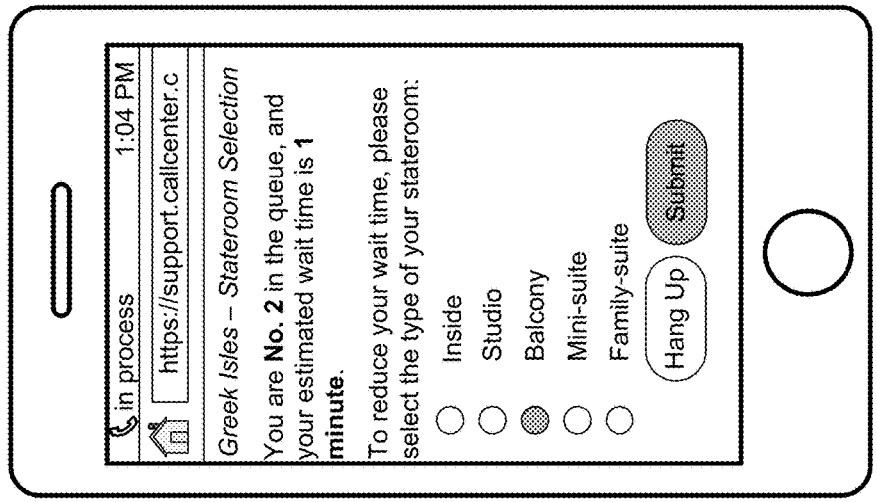
Figure 10:
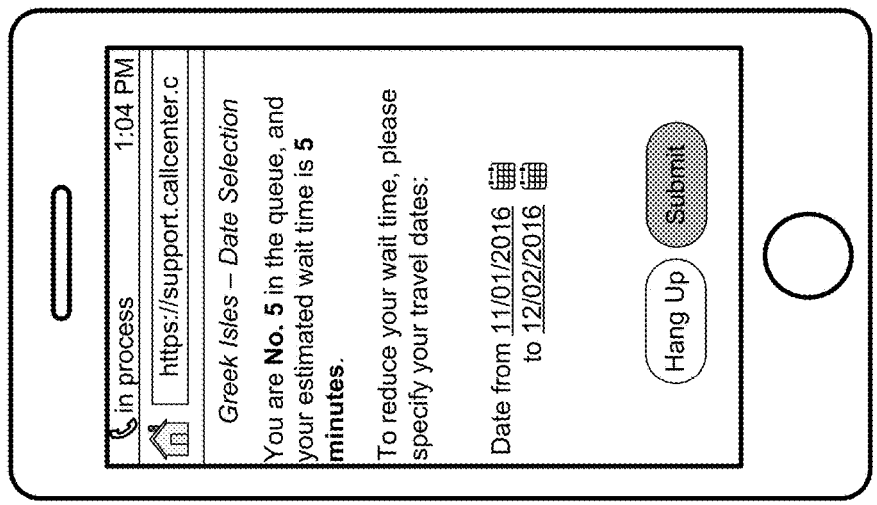

FIGS. 5-12 illustrate exemplary user interface of the customer's mobile device 116 for allowing the customer to interact with the call center. In FIG. 5, the customer 112 may initiate a call with the call center 100 by dialing a phone number associated with the call center. Once the customer 112 is authenticated, the mobile device 116 may receive an instruction from the call center system 110 to display a web page with a series of questions to ascertain the customer's cause for the request. The questions may be crafted to reduce the scope of the customer's inquiry. For example, as illustrated in FIGS. 6-11, the customer may be asked to identify his or her cause for the request. Each successive question may be narrower than its preceding question. In the illustrated example, a call center of a commercial website offering travel-related services may help the customer to book a reservation. As shown in FIGS. 6-11, as the customer answers each question, the customer's position in the queue becomes escalated, and the customer's wait time becomes reduced.

Figure 12:
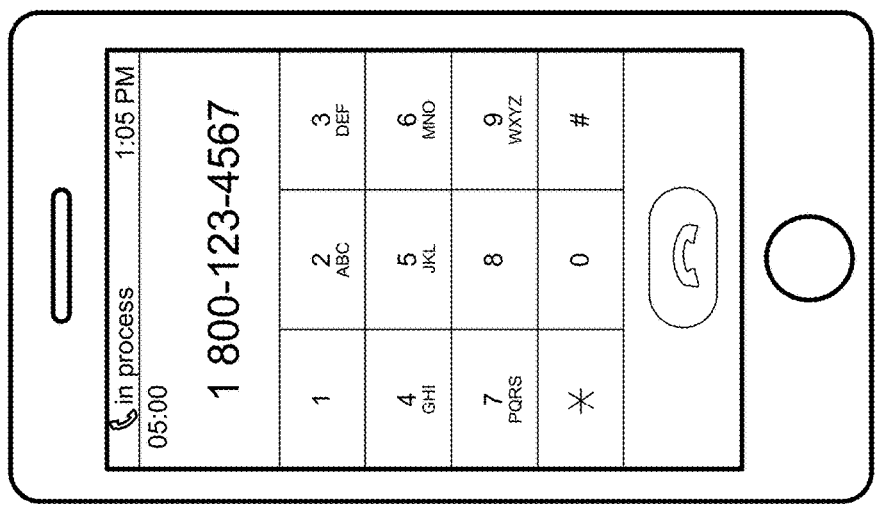

Once the customer completes the reservation on the web page, the customer may terminate the call. Of course, if the customer is unsatisfied with the web page solution, or wishes to speak to an agent, the customer may refuse to participate in the web page questions, and may stay on hold until a next agent becomes available as illustrated in FIG. 12.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. For example, the disclosed technology may be applied to many industry areas, including but not limited to commercial transactions, reservation systems, and financial services such as telephone banking, credit card and insurance services, among many other possibilities.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for routing a call request for service in a call center comprising:
   a non-transitory computer-readable medium storing data representative of a queue of customers waiting to be serviced; and
   a processor configured to:
      queue the call request for service initiated by a customer via a voice communication channel generated from the customer's mobile device;
      send data representative of an URL address to the customer's mobile device via a data communication channel, and the URL address identifying a web page containing information to ascertain the customer's cause for the call request;
      send an instruction to the customer's mobile device to open the URL address in a web browser of the mobile device;
      receive data input from the customer's mobile device via the data communication channel indicative of the customer's cause for the call request;
      identify an agent from a plurality of agents suitable to address the caller's cause for the call request;
      adjust the customer's position in the queue based on the identified agent; and
      determine a routing instruction about routing the customer's call request to the identified agent.

2. The system of claim 1, wherein the processor is configured to simultaneously connect with the mobile device via the voice communication channel and the data communication channel.

3. The system of claim 1, further comprising:
   a switch coupled to the processor, the switch configured to receive the call request via the voice communication channel and route the call request to the identified agent based on the routing instruction.

4. The system of claim 1, wherein the processor is configured to communicate with the customer via interactive voice response.

5. The system of claim 1, wherein the processor sends at least one of the customer's position in the queue and the customer's wait time to the customer's mobile device via the data communication channel for display on the customer's mobile device.

6. The system of claim 1, wherein the voice communication channel transmits voice over a public-switched telephone network.

7. The system of claim 1, wherein the data communication channel transmits data over a packed switched network.

8. The system of claim 1, wherein the processor is configured to authenticate the customer via the voice communication channel.

9. The system of claim 1, wherein the processor is configured to calculate the customer's wait time in the queue based on the adjusted customer's position in the queue.

10. The system of claim 1, wherein the processor is configured to send data representative of a plurality of questions to the mobile device, receive data input from the mobile device via the data communication channel in response to at least one question, and adjust the customer's position in the queue based on the data input.

11. A method for routing a call request for service in a call center, comprising:
- storing, by a non-transitory computer-readable medium, data representative of a queue of customers waiting to be serviced;
- receiving, by a processor, the call request for service initiated by a customer via a voice communication channel generated from the customer's mobile device;
- queuing, by the processor, the call request for service;
- sending data representative of an URL address to the customer's mobile device via a data communication channel, and the URL address identifying a web page containing information to ascertain the customer's cause for the call request;
- sending an instruction to the customer's mobile device to open the URL address in a web browser of the mobile device;
- receiving, by the processor, data input from the customer's mobile device via the data communication channel indicative of the customer's cause for the call request;
- identifying, by the processor, an agent from a plurality of agents suitable to address the customer's cause for the call request;
- adjusting, by the processor, the customer's position in the queue based on the identified agent; and
- determining, by the processor, a routing instruction about routing the customer's call request to the identified agent.

12. The method of claim 11, further comprising simultaneously maintaining connections with the mobile device via the voice communication channel and the data communication channel.

13. The method of claim 11, further comprising:
- receiving the call request by a switch via the voice communication channel; and
- routing the call request to the identified agent based on the routing instruction.

14. The method of claim 11, further comprising calculating, by the processor, the customer's wait time in the queue based on the adjusted customer's position in the queue.

15. A non-transitory computer-readable medium, comprising computer-executable instructions, for causing one or more processors to execute the computer-executable instructions to:
- receive a call request for service initiated by a customer via a voice communication channel generated from the customer's mobile device;
- queue the call request for service;
- send data representative of an URL address to the customer's mobile device via a data communication channel, and the URL address identifying a web page containing information to ascertain the customer's cause for the call request;
- send an instruction to the customer's mobile device to open the URL address in a web browser of the mobile device;
- receive data input from the customer's mobile device via the data communication channel, the data input indicative of the customer's cause for the call request;
- identify an agent from a plurality of agents suitable to address the customer's cause for the call request;
- adjust the customer's position in the queue based on the identified agent; and
- determine a routing instruction about routing the customer's call request to the identified agent.

* * * * *